United States Patent

Keller

Patent Number: 5,273,584
Date of Patent: Dec. 28, 1993

[54] DEVICE FOR THE DOSED CONVEYING OF POWDER TO A POWDER PROCESSING UNIT

[75] Inventor: Silvano Keller, Böttstein, Switzerland

[73] Assignee: Plasma-Technik AG, Wohlen, Switzerland

[21] Appl. No.: 868,822

[22] Filed: Apr. 14, 1992

[30] Foreign Application Priority Data

Apr. 15, 1991 [DE] Fed. Rep. of Germany ....... 4112268

[51] Int. Cl.$^5$ .............................................. B05C 11/00
[52] U.S. Cl. .................... 118/692; 118/308; 177/16; 177/59; 222/55; 222/56; 406/32; 406/52
[58] Field of Search ............... 118/688, 692, 697, 698, 118/712, 308; 177/16, 59, 25.11, 26; 222/55, 58, 56, 63, 636; 364/567; 406/31, 32, 52, 63

[56] References Cited

U.S. PATENT DOCUMENTS

| | | | |
|---|---|---|---|
| 2,800,252 | 7/1957 | Wahl | 118/308 |
| 4,227,835 | 10/1980 | Nussbaum | 406/52 |
| 4,528,848 | 7/1985 | Hafner | 406/63 |
| 4,576,526 | 3/1986 | Muller et al. | 222/56 |
| 4,789,569 | 12/1988 | Douche et al. | 406/52 |
| 5,038,973 | 8/1991 | Gmur | 222/58 |
| 5,104,230 | 4/1992 | Douche et al. | 406/52 |

Primary Examiner—Joseph W. Drodge
Attorney, Agent, or Firm—Dykema Gossett

[57] ABSTRACT

The device for the dosed conveying of powder to a powder processing unit, particularly to a plasma spray device, comprises a volumetric dosing unit and a weighing unit which together allow a gravimetric powder dosing. The dosing unit includes: a rotatable dosing disc having a vertical axis of rotation; a drive unit mounted below said rotatable dosing disc; and powder feeding and withdrawal means mounted above said dosing disc. This dosing unit, having first and foremost a vertical extension, is fixed to a weighing platform which rests on a plurality of weighing cells. The drive unit is arranged below said weighing platform, in order to situate the center of gravity of said dosing unit at least approximately at the level of said weighing platform. This considerably reduces the liking of the dosing unit, as compared with a weighing platform arranged entirely above the dosing unit, thus allowing a gravimetric powder dosing with high accuracy and uniformity.

10 Claims, 4 Drawing Sheets

DEVICE FOR THE DOSED CONVEYING OF POWDER TO A POWDER PROCESSING UNIT

TECHNICAL FIELD

This invention relates to a device for the dosed conveying of powder to a powder processing unit, particularly to a plasma spray device comprising a volumetric dosing unit including a rotatable dosing disc having a vertical axis of rotation, a drive unit mounted below the rotatable dosing disc, and a powder container mounted above the rotatable dosing disc. The powder container is provided with an outlet for laying down powder onto the dosing disc and with a powder take-up unit operating under gas pressure for taking up powder from the dosing disc.

BACKGROUND OF THE INVENTION

A known device of this kind is disclosed in the German Patent Specification No. 28 07 866. It comprises a volumetric dosing unit, said dosing unit comprising a rotatable dosing disc having a vertical axis of rotation, a drive member arranged below said dosing disc, as well as a powder container having an outlet for laying down powder onto said dosing disc and a powder take-up unit operating under gas pressure for taking up powder from said dosing disc, said powder container and said powder take-up unit being arranged above said dosing disc.

For working powder in a plasma spray device, an exact reproducible dosing and an even powder supply are essential. A predetermined amount per time unit of powder is to be supplied to the plasma spray device. This demand, in principle calls for a gravimetric method for dosing the powder. However, so far, in most cases the closing was achieved by a volumetric dosing, thereby calibrating the dosing unit by weight by weighing a powder portion, destined for being supplied within a certain period of time. The volumetric dosing units actually available, such as e.g. those according to said German Patent Specification No. 28 07 866, have a very good dosing accuracy. However, they show the disadvantage that calibration is to be repeated after each removal of the powder charge.

In order to avoid this disadvantage, it was already proposed to mount the dosing unit on a balance, and to control the speed of the drive motor of the dosing unit during the powder withdrawal, starting from the initial total weight of the dosing unit plus the powder stock, i.e to control the volumetric dose on the basis of the measured loss of weight.

However, it turned out that such an arrangement is quite unstable, and that in operation the dosing unit has a liking for oscillations, thus considerably reducing the dosing accuracy which could be theoretically expected on the basis of the accuracies of the balance and of the dosing unit, and possibly resulting in an irregular powder supply. The main reason for this is that the dosing unit mainly and foremost extends in vertical direction, i.e. that the dosing unit is relatively tall, form the lower end of the drive to the upper end of the powder container, as compared to the diameter of the dosing unit which is essentially determined by the lateral extension of the dosing disc. With known dosing units of the abovementioned kind, this ratio of height to diameter may be up to 5:1, and more.

OBJECTS OF THE INVENTION

It is a primary object of the present invention to provide a device for the dosed conveying of powder to a powder processing unit, particularly to a plasma spray device, by which the abovementioned disadvantages of the prior art are avoided.

It is a further object of the invention to provide a dosing device of the kind described above which, while avoiding the disadvantages of the prior art devices, allow a gravimetric powder dosing with high accuracy and uniformity.

SUMMARY OF THE INVENTION

To meet these and other objects, the present invention provides a powder dosing device comprising a volumetric dosing unit. The volumetric dosing unit includes a rotatable dosing disc having a vertical axis of rotation, a drive unit mounted below the rotatable dosing disc, and a powder container mounted above the rotatable dosing disc. The powder container is provided with an outlet for laying down powder onto the dosing disc and with a powder take-up unit operating under gas pressure for taking up powder from the dosing disc.

Further, there is provided a weighing platform, onto which the dosing unit is fixed and which is provided with a central opening. The weighing platform rests on a plurality of weighing cells which are mounted in even distribution on a circle around the axis of rotation of the dosing unit. The drive unit of the dosing unit is located below the weighing platform, in order to situate the center of gravity of the dosing unit at least approximately at the level of the weighing platform.

By these features, the likelihood of oscillations of the dosing unit is reduced to such an extent that essentially any oscillations and vibrations which impair the dosing accuracy do no longer occur. Moreover, the gravimetric dosing can be controlled in a relatively simple manner, thus avoiding the previous calibrating of the dosing device after the removal of the powder charge.

In a preferred embodiment of the dosing device according to the present invention, which is for use with a dosing unit having a flat bearing surface and comprising a cylindrical housing extending from the bearing surface vertically downwards and containing the drive unit, the weighing platform is connected to a cylindrical tube extending from a central opening in the weighing platform vertically downwards and receiving the drive unit. In this manner, the dosing unit, which is to be put on the weighing platform in axial direction, is axially and radially exactly positioned on the weighing platform, the bearing surface resting on the weighing platform and enclosing the drive housing. Suitable locking means may be provided for defining a desired angular position of the dosing unit relative to the longitudinal axis.

Preferably, the dosing unit is exchangeably mounted on the weighing platform, a plurality of clamping means being regularly arranged along the circumference of the weighing platform for securing the dosing unit to the weighing platform. Usually, the dosing unit comprises a flat cylindrical housing surrounding the dosing disc upon which the clamping means can directly act.

Furthermore, preferably, means are provided for holding the weighing platform in the center of the weighing cells and securing it against torsional movement. For this purpose, mutual guiding means may be provided on the stationary part of the device and on the weighing platform. A preferred solution is to guide the weighing platform in vertical direction by means of flectionally elastic guiding members. At the same time, such guiding means act as safety means against torsional movement of the weighing platform.

For an automatic operation of the device, preferably a control unit is provided for, comprising a stored program computer calculating—on the basis of the weighing information of the weighing device and the set point of powder throughput - the control output for the speed control of the drive motor of the dosing disc.

DESCRIPTION OF A PREFERRED EMBODIMENT

Figure 1:
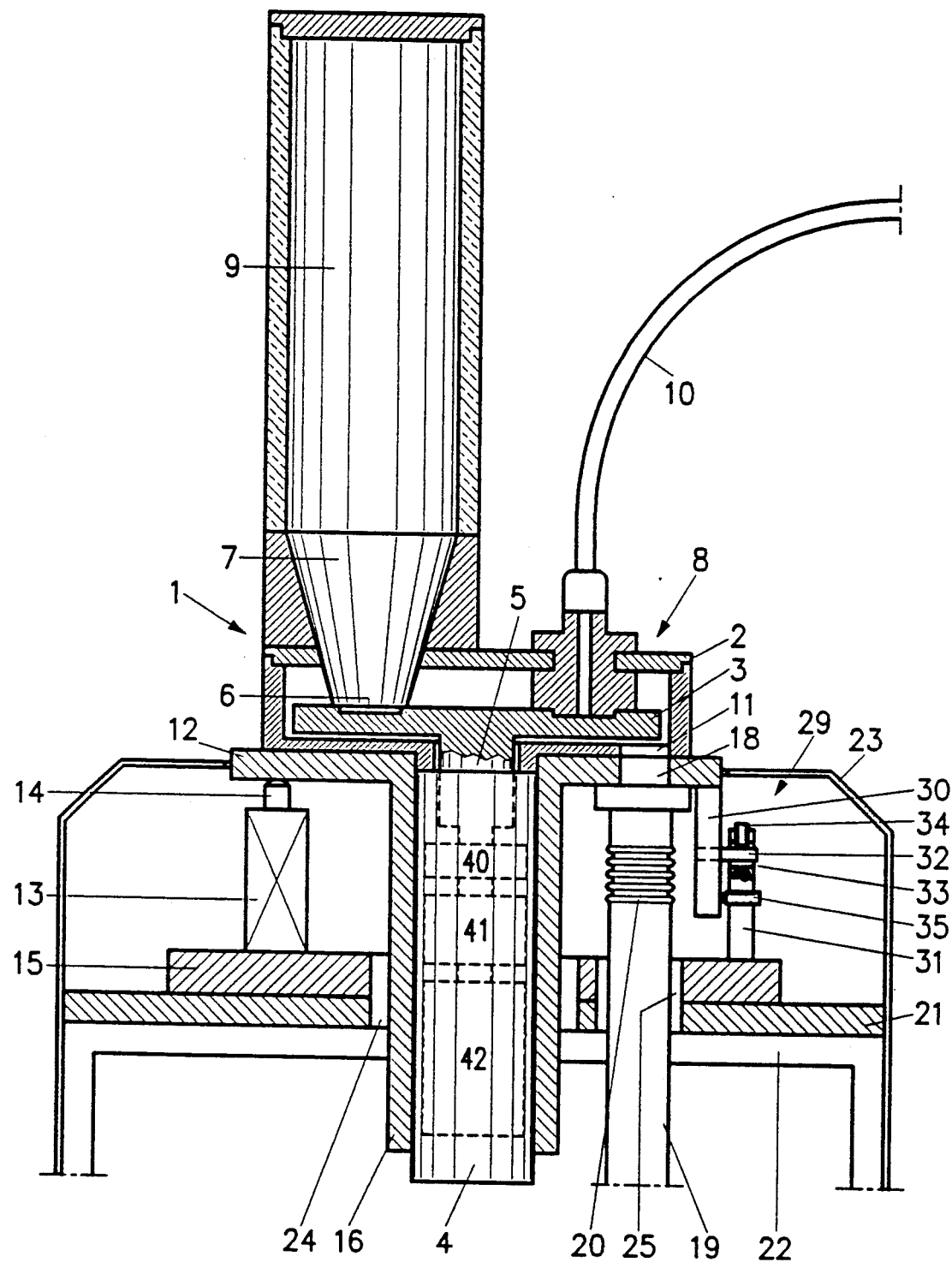
FIG. 1 is an axial longitudinal section of a device according to a first embodiment of the invention along line I—I in FIG. 2.
Figure 2:
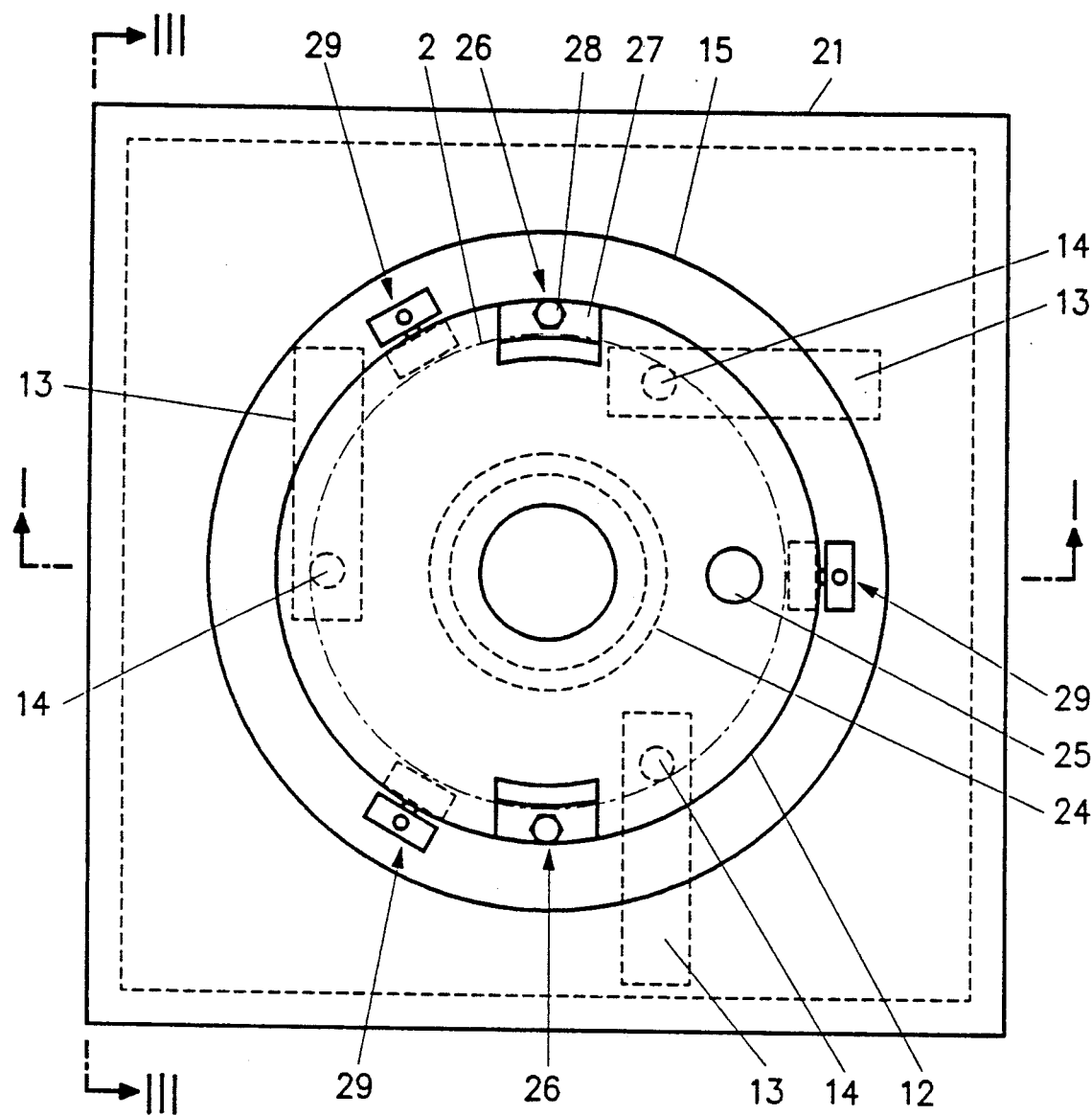
FIG. 2 is a horizontal projection of the device of FIG. 1, without dosing unit.
Figure 3:
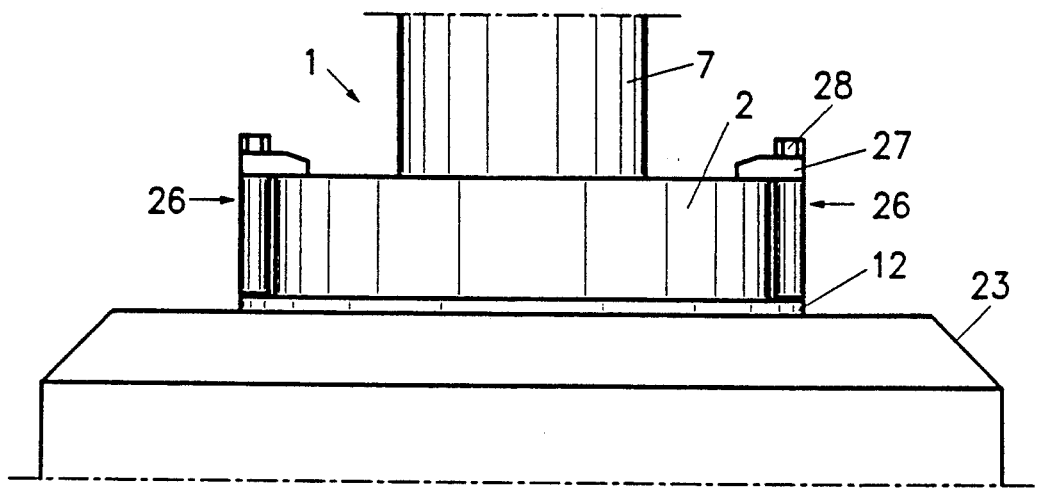
FIG. 3 is a side elevation of the middle part of the device of FIG. 1, in the direction of arrows III—III in FIG. 2.

The embodiments shown in the drawings comprise a dosing unit, generally designated with reference numeral 1, which is essentially known form said German Patent Specification No. 28 07 866. This dosing unit is designed for a volumetrically dosed supplying of powder to a powder processing unit, particularly to a plasma spray device.

A dosing disc 3 is gas-tightly mounted in a two-piece flat cylindrical housing 2 of the dosing unit 1. A further cylindrical housing 4, containing the drive unit of the dosing unit, is secured to the underside of said housing 2. The drive unit comprises in a manner not shown in detail a speed controlled drive motor 42 which is connected to a shaft end 5 of the dosing disc 3 by means of a coupling 40 and a gear transmission 41. A flat powder groove 6, designed as an annular groove, is provided in the dosing disc 3. The powder is supplied to the powder groove 6 from a funnel 7 and evacuated therefrom by an exhaust device 8. A tightly closed powder container 9 is mounted above the funnel 7. The exhaust device 8 is connected to a powder processing unit (not shown) by means of a flexible tube 10. An inlet port 11 for the compressed gas used for operating the exhaust device 8 is provided on the underside of the housing 2.

The underside of the housing 2 forms a bearing surface by means of which the dosing unit 1 rests on a circular weighing platform 12. This weighing platform 12 is part of the weighing unit, which in the present example comprises three weighing cells 13. The weighing platform 12 rests on the load suspension members 14 of the weighing cells 13. With respect to their load suspension members 14, the weighing cells 13 are uniformly distributed on a base plate 15 which is of circular configuration as well around the axis of rotation of the dosing unit 1. The weighing platform 12 is connected to a cylindrical tube 16 extending from a central opening in the weighing platform 12 vertically downwards and receiving the drive unit of the dosing unit 1.

The weighing platform 12 further comprises a passage bore 18 which corresponds to the inlet port 11 of the housing 2 and to which a flexible gas pressure pipe 19 is connected. The flexibility of said gas pressure pipe 19 is outlined in the drawing by a wrinkled structure 20.

The base plate 15 of the weighing unit is mounted on a square rack plate 21 resting on a rack frame 22. The whole weighing unit is closed by a boarding 23. The base plate 15 and the rack plate 21 are provided with bores 24 and 25 for allowing the free passage of the cylindrical tube 16 of the weighing platform 12 and of the gas pressure pipe 19, respectively.

The dosing unit 1 is exchangeably fixed to the weighing platform 12 by means of swivel-mounted clamping members 26 the clamping jaws 27 of which overlapping the housing and being tightened by means of clamping screws 28. In the present example, there are two diametrically mounted clamping members 26. The clamping members shown may be replaced, e.g., by strap buckles.

The device also comprises means for holding the weighing platform 12 in the center cf the weighing cells 13 and for securing it against torsional movement. In the present example, these means are constituted by three guiding members 29 which are evenly distributed along the circumference of the weighing platform 12. The guiding members 29 comprise an upper guiding part 30 secured to the weighing platform 12, and a lower guiding part 31 secured to the base plate 15. A bolt 32 fixed to the upper guiding part 30 engages into a vertical longitudinal slot 33 of the lower guiding part 31, thus preventing torsional movement of the weighing platform 12. The vertical upward movement of the weighing platform 12 is limited by a check screw 34, and a lateral movement of the weighing platform 12 is prevented by a check screw 34 in the lower guiding part 31.

Figure 4:
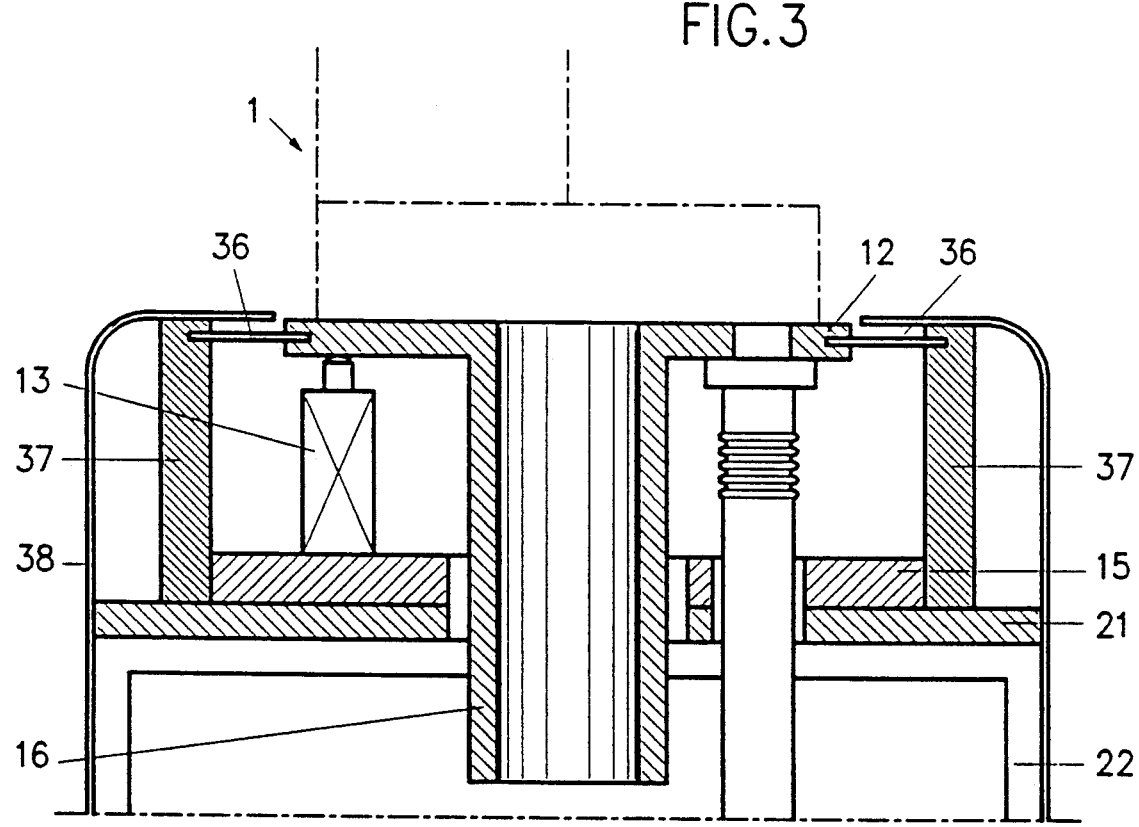
FIG. 4 is an axial longitudinal section of part of a device according to a second embodiment of the invention.

For the same purpose, in the embodiment shown in FIG. 4, the weighing platform 12 is vertically movable guided by flectionally elastic guiding members 36, each of said guiding members being secured, on the one hand, to the circumference of the weighing platform 12 and, on the other hand, to a support 37 mounted on the base plate 15. The whole unit is covered by a boarding 38.

Figure 5:
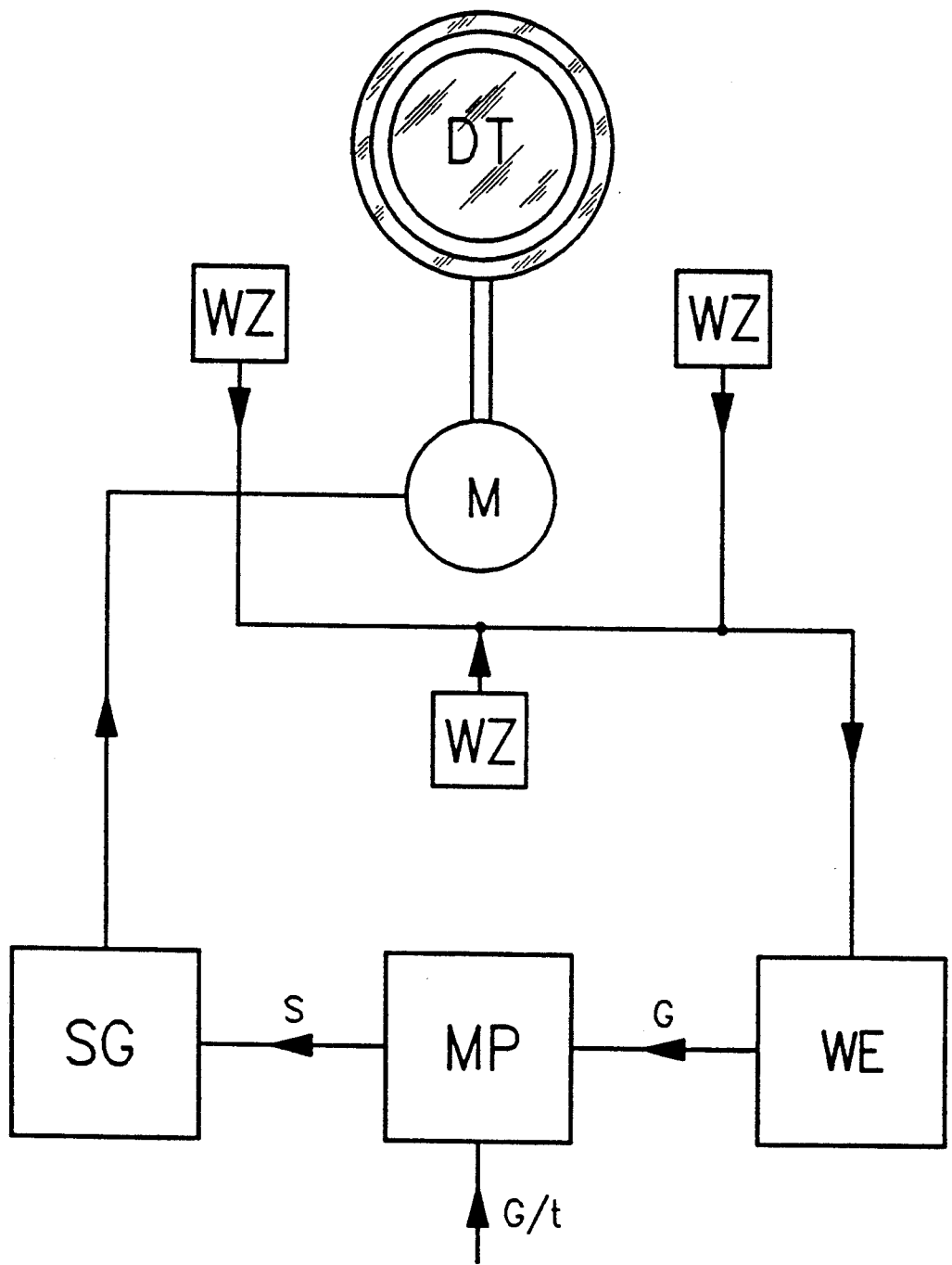
FIG. 5 is a block diagram of a control unit for the automatic operation of the device according to the invention.

The block diagram of FIG. 5 shows a drive motor M for the dosing disc DT and three weighing cells WZ. The weight signals generated by the individual weighing cells WZ are processed in the weighing electronics WE for forming a signal representing the total weight G. This signal is fed to the micro processor MP which calculates, from the total weight G and the set point G/t of the powder throughput, the control output S which is converted by the actuator SG into the number of revolutions of the drive motor M.

What is claimed is:

1. A device for the dosed conveying of powder to a powder processing unit, said device comprising:
    a volumetric dosing unit including a rotatable dosing disc having a vertical axis of rotation, a drive unit mounted below said rotatable dosing disc, a powder container mounted above said rotable dosing disc, said powder container being provided with an outlet for laying down powder onto said dosing disc, and a powder take-up unit mounted and arranged to receive powder from said dosing disc, said powder take-up unit operating under gas pressure for taking up powder from said dosing disc; and a weighing platform, onto which said dosing unit is fixed and which is provided with a central opening, said weighing platform resting on a plurality of weighing cells which are mounted in even distribution on a circle around the axis of rotation of said dosing disc, said drive unit of said dosing unit being arranged below said weighing platform.

2. A device according to claim 1, wherein said dosing unit comprises a flat bearing surface and a cylindrical housing extending through said central opening of the weighing platform vertically downwards and receiving said drive unit, said weighing platform being connected to a cylindrical tube extending from said central opening of said weighing platform vertically downwards and receiving said cylindrical housing.

3. A device according to claim 1, wherein said dosing unit is releasably mounted on said weighing platform, such that a first dosing unit may be exchanged for a second dosing unit.

4. A device according to claim 3, wherein said dosing unit is provided with a plurality of clamping members, evenly distributed along its circumference, for fixing said dosing unit to the weighing platform.

5. A device according to claim wherein said clamping members act on a flat cylindrical housing of said dosing unit which is surrounding said dosing disc.

6. A device according to claim 1 further comprising means for holding said weighing platform in the center of said weighing cells and securing it against torsional movement.

7. A device according to claim 6, wherein said weighing platform is guided for movement in a vertical direction by elastic guiding members.

8. A device according to claim 1 further comprising a control unit having a processor means for calculating a control output used in providing a rotational speed for said dosing disc.

9. The device according to claim 8, wherein said control output is calculated using a powder weight and a set point of powder throughput, said powder weight being provided by a weighing device including sad weighing platform.

10. The device according to claim 1, wherein said drive unit of said dosing unit is arranged below said weighing platform such that the center of gravity of said dosing unit is approximately at the level of said weighing platform.

* * * * *